Sept. 12, 1939.   A. V. ZUVER   2,172,885
AUTOMOBILE FRAME
Filed Dec. 6, 1937   2 Sheets-Sheet 1
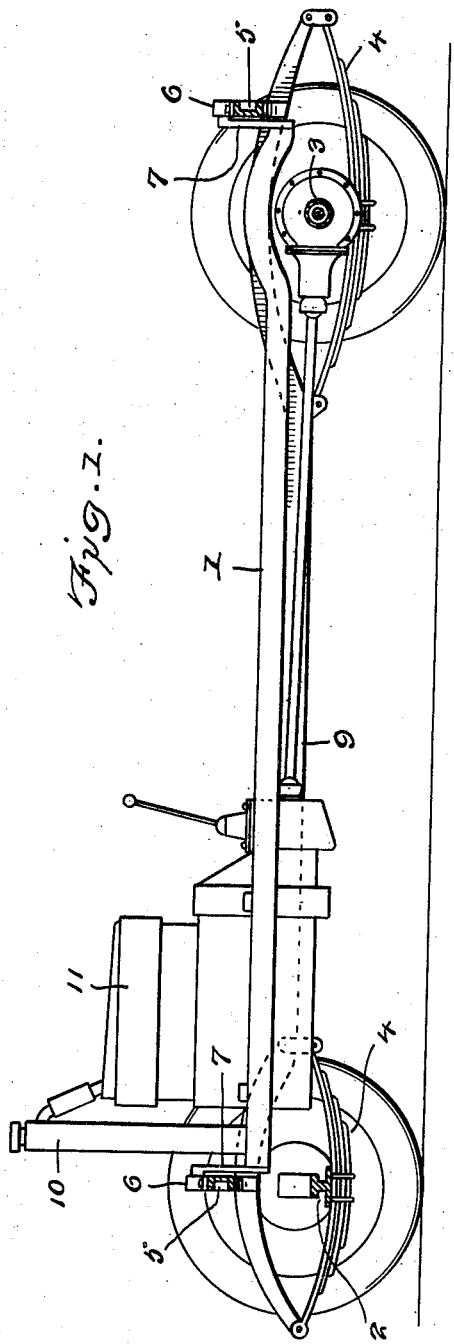
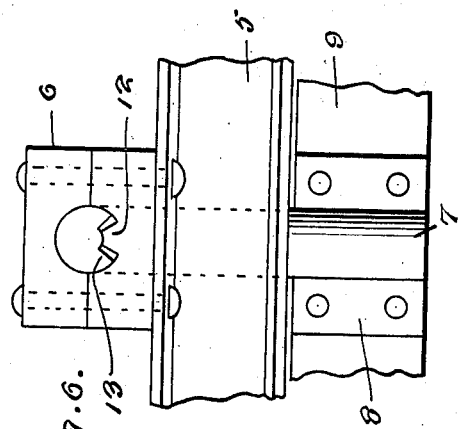
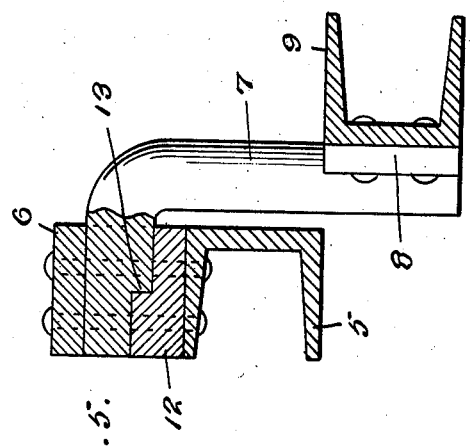
A. V. Zuver
INVENTOR
BY Victor J. Evans & Co.
ATTORNEYS

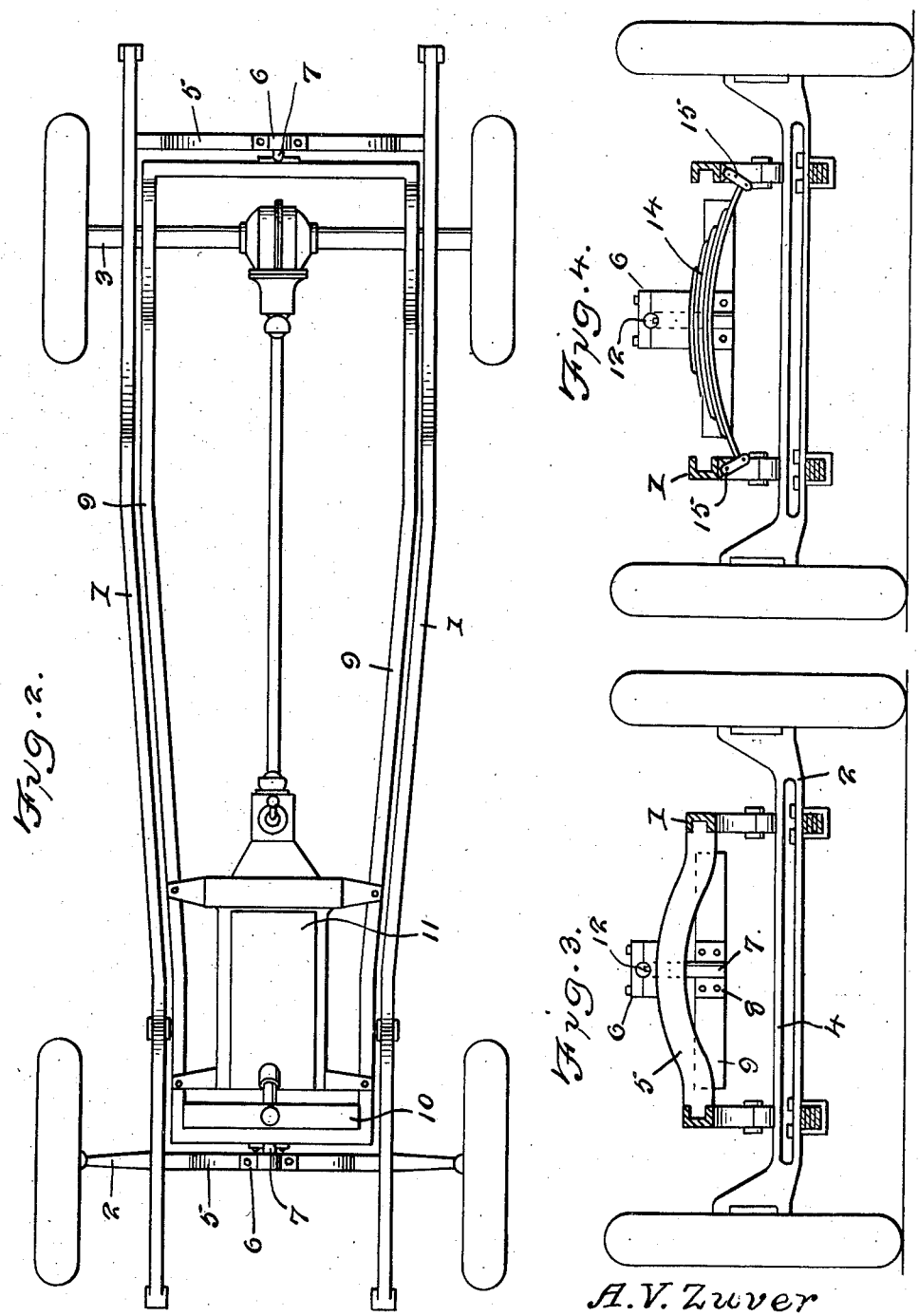
Sept. 12, 1939.    A. V. ZUVER    2,172,885
AUTOMOBILE FRAME
Filed Dec. 6, 1937    2 Sheets-Sheet 2
A. V. Zuver
INVENTOR
Victor J. Evans & Co.
ATTORNEYS Patented Sept. 12, 1939

2,172,885

UNITED STATES PATENT OFFICE 2,172,885

AUTOMOBILE FRAME

Audley V. Zuver, Cleveland, Ohio

Application December 6, 1937, Serial No. 178,384

2 Claims. (Cl. 280—106.5)

This invention relates to an automobile construction and more particularly to a body supporting means whereby the body may remain on an even keel when the automobile passes over an obstruction or uneven roadways to increase riding comforts to the occupants of an automobile and to prevent road shocks from being transmitted upwardly to the body from the wheels or running gear of the automobile and consists of a minimum number of parts and permits the use of conventional axle and spring construction and eliminates excessive number of parts as are found in knee action construction frequently employed on automobiles.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating an automobile construction constructed in accordance with my invention.

Figure 2 is a top plan view illustrating the same.

Figure 3 is a transverse sectional view showing the device.

Figure 4 is a transverse sectional view illustrating a modification of my invention.

Figure 5 is a fragmentary vertical sectional view showing one of the hangers.

Figure 6 is a fragmentary front elevation showing said hanger.

Referring in detail to the drawings, the numeral 1 indicates a main frame of a motor vehicle chassis supported on the front and rear axles 2 and 3 by springs 4. This construction is conventional in present day automobiles and to which my invention is adapted. The cross members 5 of the main frame are equipped with bearings 6 located in alignment with the longitudinal axis of said frame and support for a limited rotation hangers 7. The hangers depend from the bearings and terminate in brackets 8 located in a plane below the main frame and have secured thereto the front and rear ends of an auxiliary frame 9. The auxiliary frame has mounted thereon the radiator 10, engine 11 and the body of the vehicle, said body not being shown. The hangers 7 are connected to the auxiliary frame in alignment with the longitudinal axis of said auxiliary frame. Keys 12 are formed on the bearings and are loosely received in keyways 13 formed in the hangers 7 for the purpose of limiting the rotation of the hangers in the bearings and consequently limiting the relative movements between the frames 1 and 9. However, the main frame when subjected to road shocks may raise or lower relative to the auxiliary frame 9, while the latter remains on an even keel. The hangers being connected to the main frame and the auxiliary frame in alignment with the longitudinal axes of said frames will prevent road shocks acting directly upwardly from being transmitted to the body of the vehicle, consequently providing an easier and more comfortable riding vehicle.

Instead of having the bearings 6 mounted on cross members of the main frame they may be mounted intermediate the ends of semi-elliptical springs 14, the ends of said springs being connected to the main frame or side members thereof by spring shackles 15. The springs 14 are arranged transversely of the main frame. The springs 14 act to absorb road shocks received by the main frame from being transmitted to the auxiliary frame.

What is claimed is:

1. In combination with a motor vehicle construction including a main frame having side and transverse members, an auxiliary frame rockable within said main frame, and aligned hangers pivotally connecting said auxiliary frame to said transverse members and located in the longitudinal axes of said frames and constituting the sole connections between the frames thereby permitting free transverse rocking of said auxiliary frame relative to said side members and free pivotable movement of said auxiliary frame relative to said transverse members.

2. In combination with a motor vehicle construction including a main frame having side and transverse members, an auxiliary frame rockable within said main frame and having cross members, and hangers pivotally connecting said cross members to said transverse members intermediate the ends of both the former and latter and constituting the sole connections between the frames thereby permitting free transverse rocking of said auxiliary frame relative to said side members and free pivotable movement of said cross members relative to said transverse members.

AUDLEY V. ZUVER.